Jan. 2, 1951 L. EDELMANN 2,536,161
TUBE CUTTER
Filed Dec. 30, 1946
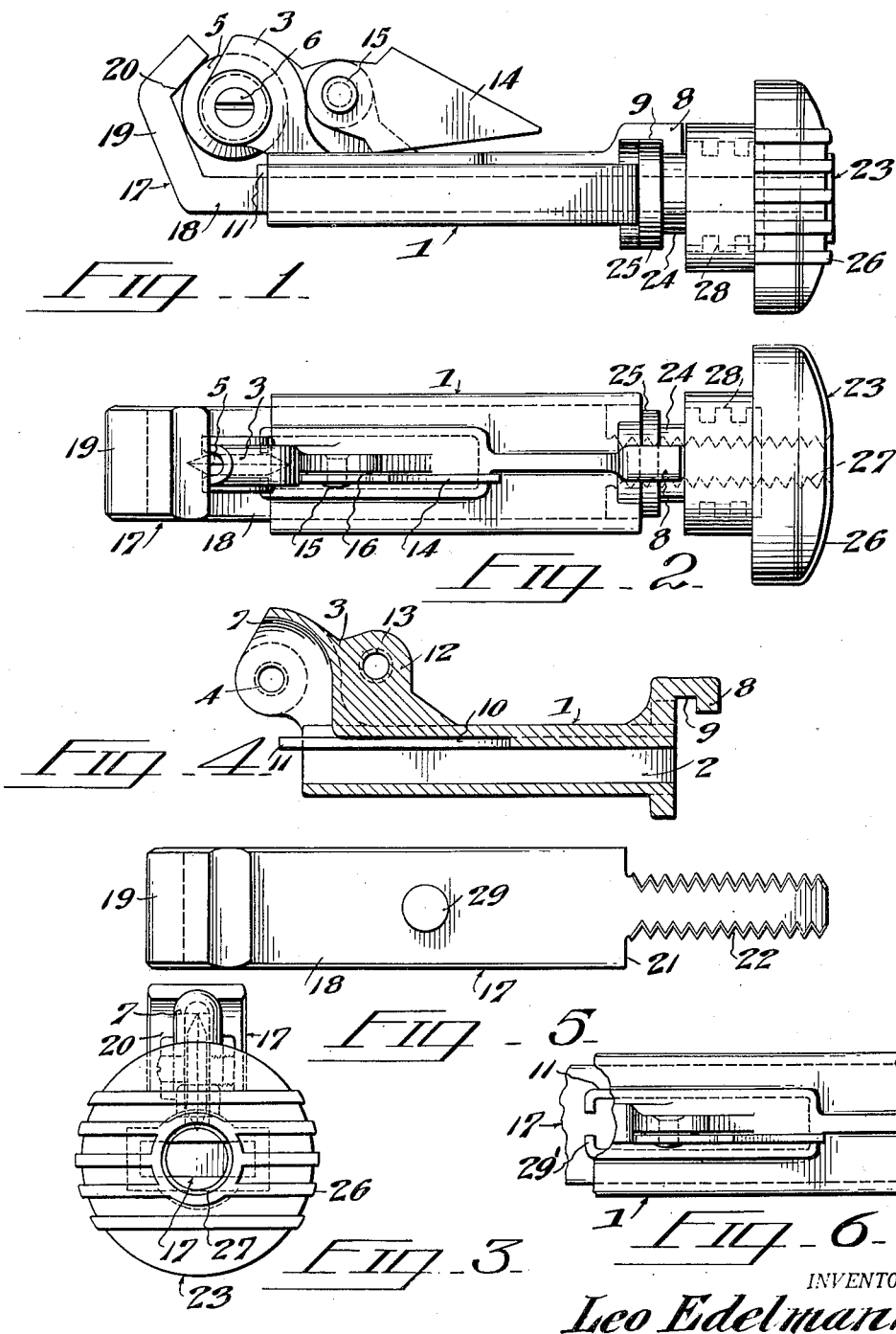
INVENTOR.
Leo Edelmann
BY Lloyd W. Bates Patented Jan. 2, 1951

2,536,161

UNITED STATES PATENT OFFICE 2,536,161

TUBE CUTTER

Leo Edelmann, Chicago, Ill.

Application December 30, 1946, Serial No. 719,260

2 Claims. (Cl. 30—102)

My invention relates to improvements in tube cutters, and particularly to a hand operated and manipulated tool of this character intended and adapted to be used in cutting tubes or pipes of copper, brass, block tin, lead, or other materials.

An object of this invention is to provide a tube cutting tool that can be used to quickly and neatly cut or sever a tube or pipe, giving a clean and straight cut, without crushing or deforming or injuring the tubing in any manner on either side of the cut, and which tool has a reamer conveniently available for removing any burr or irregularity that may accumulate within the tube at the cut end, thus giving a smooth and finished cut and without roughness or obstructions.

A further object is to provide a tool capable of use in cutting tubes and pipes of different sizes, and having different thicknesses of side walls, the parts being readily adjustable to accommodate different sizes of tubing and to give desired depths or degrees of cutting.

Another object is to provide a tube cutter tool which is of simple and inexpensive construction, readily manufactured and assembled, and which is capable of being used while held and manipulated in a single hand, thus leaving the user's other hand available to hold or support or steady the tube or pipe being cut.

Another purpose is to so construct the tool that it can be made up and assembled from stampings and die castings, with a minimum of threading and other machine work and operations, and be capable of adjustment to compact form for handling and carrying in a pocket or in a tool kit.

With the above and other objects in view, some of which will be apparent to those skilled in the art, and others of which are inherent in the construction and assembly and use of the tool, my invention includes certain novel features of construction and combinations and arrangements of parts which will be hereinafter set forth in connection with the drawing, and then pointed out in the claims.

In the drawing:

Figure 1 is a view in side elevation of a tube cutter made according to my invention and with the parts adjusted to the compact relationship which they may occupy when not in use.

Fig. 2 is a top plan view of the structure disclosed in Figure 1.

Fig. 3 is a view in end elevation looking toward the handle end of the tube cutter.

Fig. 4 is a longitudinal sectional view through the body of the tool.

Fig. 5 is a top plan view showing the clamping bar.

Fig. 6 is a fragmentary view with parts broken away to better show the parts retaining the clamping bar within the body.

The body 1 is elongated and is preferably substantially rectangular in cross section, and this body has an opening 2 therethrough, which opening is also substantially rectangular in cross section. At one end, the body is provided with a bearing bracket 3, having transverse openings 4 therethrough, and one of the openings being internally screw threaded. A cutting wheel 5 is held within the bearing bracket, for rotational movement, by a bearing screw or pin 6. The bearing bracket structure is so made that it is open at its forward and lower sides, and is hooded or shielded on its upper and inner sides, as at 7, to thus expose the forward and lower portions of the cutter wheel 5, and shield the upper and inward portions of the edge of this cutter wheel. At its opposite end, the body portion is provided with an overhanging retaining hook portion 8, with a swivel opening 9 at the end of the body 1, as perhaps best shown in Figs. 1 and 2. A spline or key groove 10 is provided on the upper portion of the body and preferably substantially centrally of the opening 2, and at the ends of this way 10, the body 1 is provided with bendable retaining fingers 11.

Rearwardly of the bearing bracket 3, the body is provided with a bearing ear 12, having an opening 13 therethrough, and a reamer member 14 is slingably mounted on this bearing ear by a rivet or other fastening 15, washer 16 being preferably provided between the reamer blade 14 and the bearing ear 12 so that the reamer blade can be conveniently and readily swung to a folded position as illustrated in Figure 1, and can be swung outwardly to extend substantially at right angles to the body 1 to be presented in a position where it can be readily applied and used within the end of a tube, to remove a burr or other roughness, with the tool body grasped in the hand.

The body 1 can be readily and conveniently and economically made up as a die casting, and thus can have the various portions and the several openings and ways formed therein to substantially accurate and finished dimensions, and the retaining fingers 11 can be conveniently bent from their original cast formation to their retaining position.

A clamping bar 17 has a body portion 18 adapted to be received and to fit slidably through the opening 2 of the body, and this clamping bar has one end thereof shaped to provide a centering and clamping hook portion 19, with a V-groove 20 presented toward the exposed outer edge of the cutter wheel 5.

The clamping bar 17 has the body 18 thereof made of greater length than the extent of the opening 2, and the end of the body 2 away from the hook portion 19 is reduced, as at 21, and is externally screw threaded at 22. The clamping bar is to be disposed slidably within the opening 2, with the hook portion 19 adjacent to the cutter wheel 5, and the threaded portion 22 extending outwardly from the end of the body 1 adjacent to the hook 8 and the swivel opening 9.

A handle 23, which can also be a die casting, has an insert or extension 24 thereon terminating in a swivel flange or collar 25, and this handle 23 is preferably provided with ribs 26, or is otherwise roughened to provide for a convenient holding and rotation by the hand of the user. The handle 23 has an opening therethrough which is internally screw threaded, at 27, to receive and turn upon the screw threaded portion 22 of the clamping bar 17. The handle 23 can conveniently be made by providing an insert 28 which can be shaped to provide the extension 24 and swivel flange 26, and this insert is preferably of such metal that the screw threads 27 thereof will withstand the strains and friction and other conditions of use. The insert 28 can be cast into or otherwise incorporated with the handle 23, by die casting or other suitable manufacturing operations.

The clamping bar 17 has a retaining pin or lug 29 thereon adapted to be received and to slide within the way 10 in the upper side of the passage or opening 2 of the body 1. In assembling the clamping bar with the other parts, the handle 23 is located with the swivel flange 25 thereof within the swivel opening 9, the clamping bar has the body portion 18 thereof moved endwise into the opening 2, and the handle 23 is then rotated to turn the threaded portion 27 thereof on to the threaded end 22 of the clamping bar 17. In this assembly, the hook portion 19 has the angle of the V-groove 20 thereof presented in line with the exposed outer cutting edge of the cutter wheel 5, and the pin or projection 29 is drawn into the way 10. The retaining fingers 11 are then bent inwardly, substantially as shown at 29' in Fig. 6, and these retaining fingers will then limit outward movement of the clamping bar to such extent that the parts will not become disassembled.

As the parts are illustrated in Figs. 1 and 2, the clamping bar 17 is drawn in to its fullest extent with respect to the cutter wheel 5, and it will of course be appreciated that when the tool is to be used in cutting a tube, the handle 23 will be turned or rotated to extend the clamping bar so that the tube can be inserted within the V-groove of the hook 19 of the clamping bar. When the tube is in position, the handle 23 is rotated in a reverse direction to draw the hook 19 toward the cutter wheel 5 so that the cutting edge of the cutter wheel engages and cuts into the tube. The tool can be readily held and manipulated by the use of one hand, and the user will have the other hand free to be employed in holding or steadying the tube. By slightly turning the handle 23, the hook portion 19 of the clamping bar will be moved closer to the cutting edge of the cutter wheel 5, and thus the tube will be fed to the cutter wheel and the cut will be deepened as the tool is swung around the tube.

The V-groove tube contacting surface 20 of the hook end 19 of the clamping bar 17 presents broad flat surfaces which will not mar or scar or otherwise mark or damage the tube or any surface finish thereof, and since the cutter wheel 5 will be made in a straight peripheral band around the tube, a clean and square cut will be accomplished. When the tube has been cut or severed, the cut ends can be readily withdrawn in an axial direction, or the handle 23 can be manipulated to move the hook 19 away from the cutter wheel 5 to clear the tube.

Ordinarily, cutting the tube wall with a rotating cutter wheel 5 will cause inward compression of the tube wall material at the line of the cut, to thus accumulate a burr or roughness within the opening of the tube at the cut end. This roughness or burr can be readily removed or smoothed by swinging the reamer blade 14 to the outstanding position and then grasping the body portion 1 and rotating the reamer blade 14 within the open end of the tube, while applying sufficient pressure to smooth or cut the metal, with a reaming effect.

From the foregoing it will be seen that I have provided a tube cutter which is of simple and inexpensive construction, which can be manufactured and assembled from die castings and stampings and therefore is readily produced by ordinary manufacturing procedure, and which will permit quick and efficient cutting of a tube and efficient finishing of the cut ends, with a minimum of effort and without special operating technique or knowledge.

While I have herein shown and described only certain specific embodiments of my invention, it will be appreciated that changes and variations can be made in the form, construction, arrangement and assembly of the parts, without departing from the spirit and scope of my invention.

I claim:

1. A tube cutter comprising an elongated body having an opening longitudinally therethrough and provided at one end with a cutter wheel mounting bracket offset laterally from the opening, a cutter wheel rotatably carried by said bracket, a clamping bar slidably movable through the opening of the body having a tube engaging and centering hook at one end adjacent to the cutter wheel and having its other end externally screw threaded, said body having a key groove at one side within the longitudinal opening, a projection on the clamping bar, retaining fingers on the body engaging said projection to retain the clamping bar against displacement from the body, and a handle portion swiveled at the end of the body away from the cutter wheel and having an internally screw threaded opening receiving the threaded end of the clamping bar.

2. A tube cutter comprising an elongated body having an opening longitudinally thereof of substantially rectangular cross section, a cutter wheel mounting bracket at one end of said body offset from the opening and provided with a shielded cutter wheel mounting opening, a cutter wheel rotatably carried by said bracket within the opening and having its edge exposed beyond the end of the opening of the body, a clamping bar slidably movable through the opening of the body having a tube engaging and centering hook at one end adjacent to the cutter wheel and having its other end externally screw threaded and extending from the opposite end of the opening of the body, said body having a swivel hook adjacent to the extending end of the clamping bar, a handle portion having an internally screw threaded opening receiving the threaded end of the clamping bar and provided with a swivel flange engaged by the swivel hook, said body having a key groove extending longitudinally along one side of the longitudinal opening, a projection on the clamping bar movable in said key groove, and retaining fingers on the body interposed to retain the projection against outward removal from the key groove.

LEO EDELMANN.

REFERENCES CITED

The following references are of record in the file of this patent:

UNITED STATES PATENTS

| Number | Name | Date |
|---|---|---|
| 207,102 | Brewer | Aug. 20, 1878 |
| 767,199 | Baker | Aug. 9, 1904 |